Feb. 22, 1955   H. A. ORR   2,702,545
TROUSER CONSTRUCTION
Filed Dec. 14, 1951   3 Sheets-Sheet 1
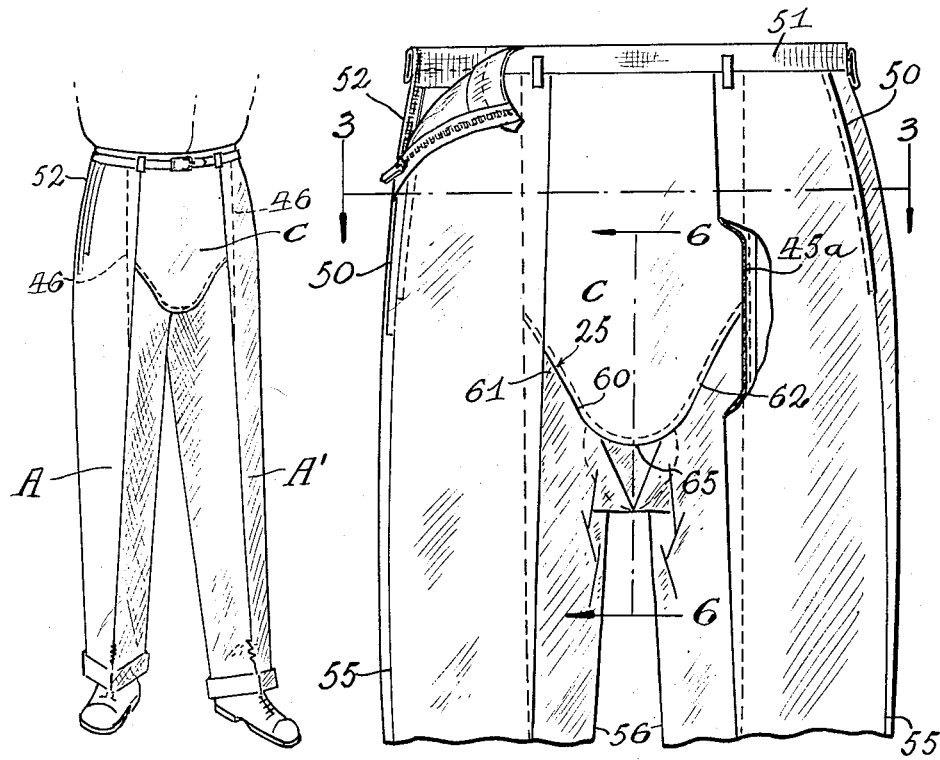
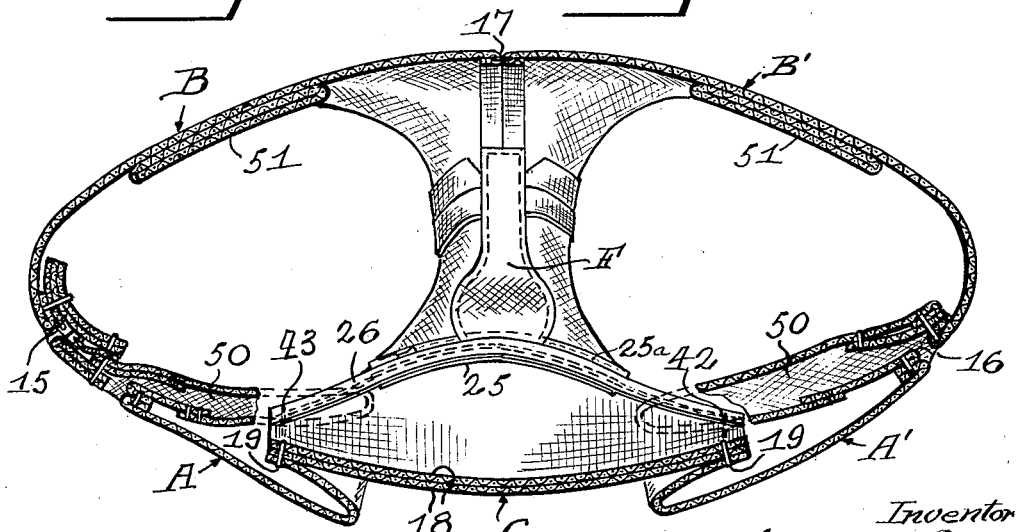
Inventor
Henrietta A. Orr Feb. 22, 1955 H. A. ORR 2,702,545
TROUSER CONSTRUCTION
Filed Dec. 14, 1951 3 Sheets-Sheet 2
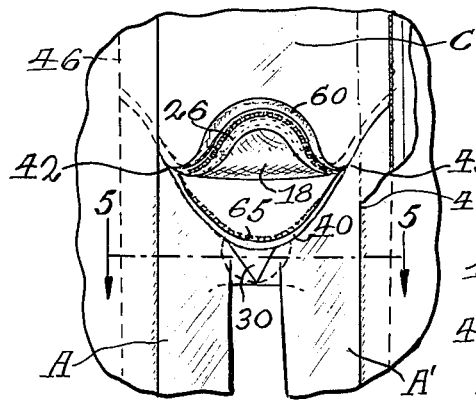
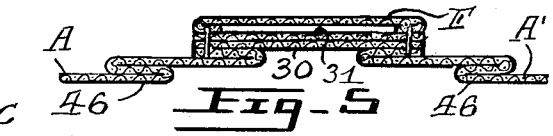
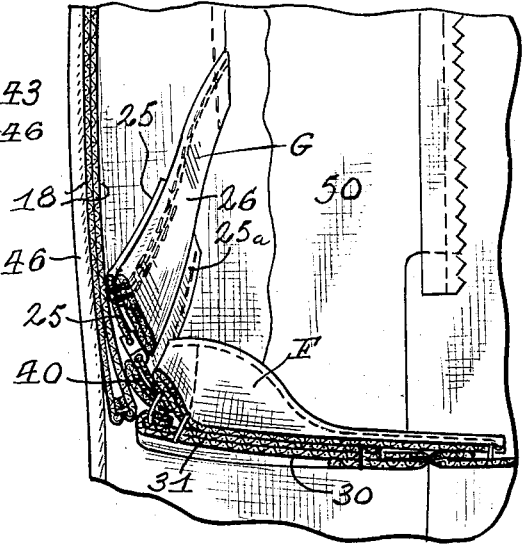
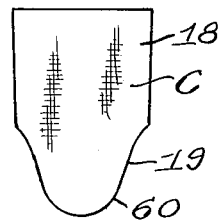
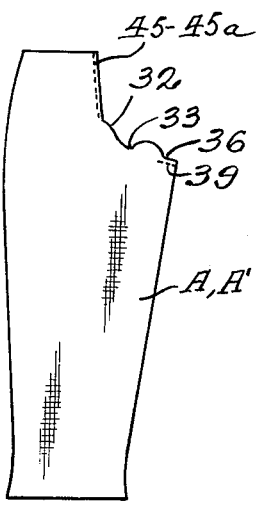
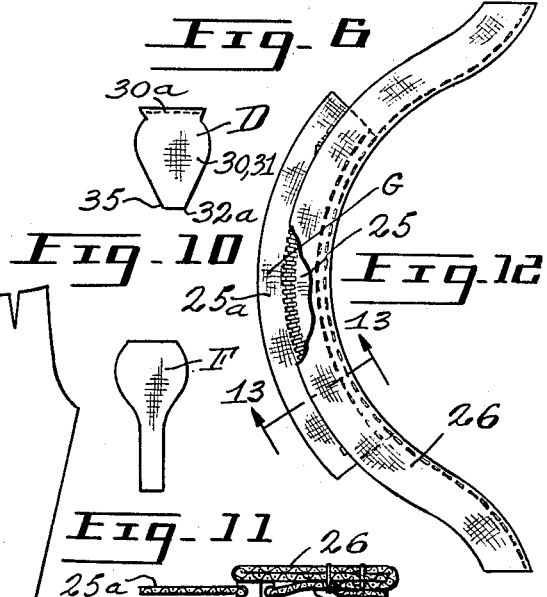
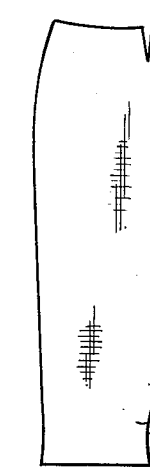
Inventor
Henrietta A. Orr
By Alan Ainsley
Attorney Feb. 22, 1955 H. A. ORR 2,702,545
TROUSER CONSTRUCTION
Filed Dec. 14, 1951 3 Sheets-Sheet 3

Inventor
Henrietta A. Orr
By [signature]
Attorney

United States Patent Office 2,702,545
Patented Feb. 22, 1955

2,702,545

TROUSER CONSTRUCTION

Henrietta Alma Orr, Montreal, Quebec, Canada

Application December 14, 1951, Serial No. 261,696

1 Claim. (Cl. 128—159)

This invention relates to trousers and more particularly to improvements in the construction of the fly or crotch region.

Disadvantages of prior art constructions are avoided and certain positive advantages provided by the present invention.

The idea underlying the invention is that the crotch portion is provided with a substantially horizontal support portion preferably accomplished by an insert or gusset between the crotch parts of the leg portions. The leg portions and gusset terminate in a substantially U-shaped upper edge. The U-shaped upper edge is adapted to be connected to a complementary lower margin of a front panel extending upwards toward the top of the garment. These edges can be joined permanently in which case a vertical fly is provided in the upper part of the trousers, or, the edges can be joined by fastening means, preferably a slide fastener, in this case forming a laterally-extending fly of which the top part is a flap which can be displaced from the bottom part to constitute the fly opening when the fly is opened. The fastening means is preferably a slide fastener. In this case one tape of the fastener is preconnected to a binding strip in a sub-assembly in which the binding strip and fastener tape are given a curvature and stitched together in this position. The binding strip is then connected to the lower margin of the jock piece. The other tape of the slide fastener is connected to the binding piped about the lower edge of the fly opening.

The invention will be understood in more detail by reference to the accompanying drawings showing a preferred embodiment of the invention, and in which:

Figure 1 is a front elevation showing the trousers as worn.

Figure 2 is an enlarged fragmentary front elevation of the trousers.

Figure 3 is a horizontal cross section substantially along the line 3—3 of Figure 2.

Figure 4 is a fragmentary front elevation of the trousers showing the fly open.

Figure 5 is a horizontal cross section along the line 5—5 of Figure 4.

Figure 6 is a vertical cross section substantially along the line 6—6 of Figure 2.

Figure 7 is a plan view of the right front leg piece.

Figure 8 is a plan view of the right rear leg piece.

Figure 9 is a plan view of the jock piece.

Figure 10 is a plan view of the support piece.

Fig. 11 is a plan view of the support lining.

Figure 12 is a view showing the slide fastener assembled with the binder tape to which it is attached.

Figure 13 is a horizontal cross section along the line 13—13 of Figure 12.

Figure 14:
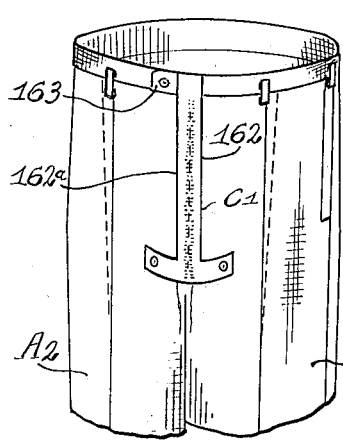
Figure 14 is a fragmentary front elevation of a pair of trousers constructed according to an alternative embodiment of the invention.

Referring more particularly to the drawings, the construction of the garment will be understood easily by following the method of its assembly. This will now be described.

Main components of the garment playing a part in the invention are shown in Figures 7 through 13.

Referring to the drawings, it will be seen that fundamentally the pants are made up of two front leg pieces A and A' and two back leg pieces B and B' which are generally connected together by seams 15, 16 and 17 during the assembly of the garment. The right hand pieces A, B are shown. The left pieces are the same but reversed in outline.

The jock part C is made up of two superimposed pieces of facing material 18 (see Figure 9) preliminary stitched together along part of their margin 19.

One tape 25 of the slide fastener G is sewn to a piece of binding tape 26 to form the sub-assembly shown in Figure 13. The tape is normally straight (not cut in a bow), but is bowed or curved in the sewing process so that the slide fastener tape 25 and the binding tape 26 are given a bow or curve. Thus the tape assumes somewhat the form that it takes in the final assembly of the garment. The tape 26 is sewn to the bottom edge of the jock part C with the slide fastener centered as best shown in Figure 3, so that it falls in position to close the fly opening.

The support piece D is made up of two superimposed pieces 30 and 31 of facing material. These pieces are doubled along their upper edge and sewn together as at 30a.

Then the support D is connected to the leg piece A as follows. The edge of the support D is connected to the edge 32 of the part A with the point 32a registering with the point 33, the point 35 registering with the point 36, and the seam carried further along between parts A and D as at 39.

A binding 40 of facing material is sewn to the facing material of the parts A and A', the edge 26 being sewn to the top edge 61 of the part A. The tape 40, the top edge 65, of the part D and the top edge 62 of the part A' are then sewn to the lower tape 25a (the one not connected to the binding tape 26) of the slide fastener G as far as the end of the fastener elements; then the tape 40 continues to be joined to the lower point of the slide fastener tape.

Then both sides of the jock part C are sewn to the parts A and A' as at 45 and 45a. Then the pleat 46 is put into the front part by stitching at the top and ironing.

Pockets 50 are put into the sides as in normal practice. And back pockets 51 are also put in. Side slide fasteners 52 are put into the pockets. Then both side seams 15, 16 are joined. Then the inner seams are joined. And the waist band 57 is applied and the back seam 17 sewn up.

The lining piece F is prepared by the operator by turning in the edges and then the top edge is turned over and applied to the bottom of the slide fastener tape 25A. Then it is fitted to the piece A and sewn to the edges of the piece D as shown.

It is thus clear that the finished garment includes a pair of front pieces A, A' and rear leg pieces B, B' joined together by seams 15, 16 and 17.

The front of the garment is made up of the front leg pieces A and A', the jock part C and the support part D suitably provided with a fly opening which is bordered by the bottom margin 60 of the jock part, at the top and at the bottom by the tape 40 connected to the combined marginal portions 61 and 62 of the leg parts A and A' and a marginal portion 65 of the support part D. To the portion 60 is attached by suitable stitching one side of the slide fastener 25, and to the combined marginal portion 61, 65, 62 is attached by suitable stitching the other side of the slide fastener 25. The two sides of the slide fastener thus close the fly opening of the garment which runs in a transverse direction of a normal front fly opening of a pair of trousers.

Figure 15:
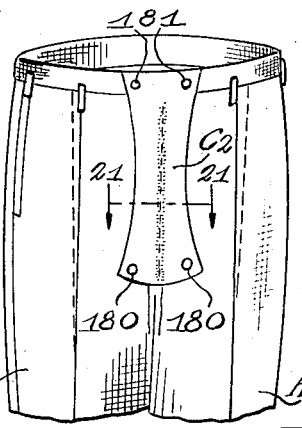
Figure 15 is a fragmentary front elevation of a pair of trousers constructed according to still another alternative embodiment of the invention.

Figures 14 and 15 illustrate other species according to the invention. The trousers are provided with a vertical fly. And, there is a jock part C1 as shown in Figure 14 or C2, as shown in Figure 15.

Figures 16, 17:
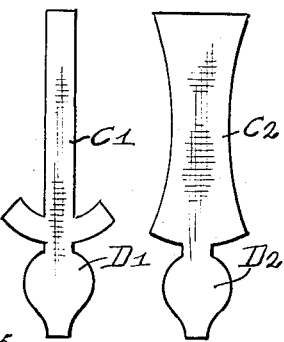
Figure 16 is a showing, on the flat, of the jock part of the form of trousers shown in Figure 14.
Figure 17 is a showing, on the flat, of the jock part of the form of trousers shown in Figure 15.
Figure 18:
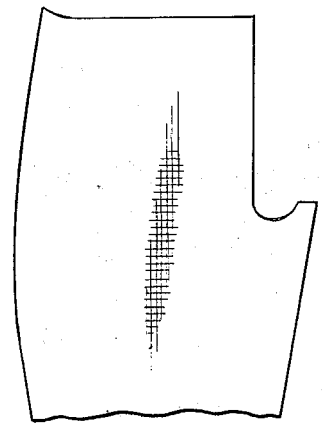
Figure 18 is a fragmentary view showing, on the flat, one of the front leg pieces of the trousers shown in Figure 14.

The actual construction of the garment shown in Figure 15 is best illustrated by reference to Figure 19. In the case of the construction of Figure 14, the margin 162 of the jock part C1 of inverted T-shape is connected to one leg A3 by a line of stitching. But, the other edge 162a of the part C1 is free. The fly is in the trousers underneath the part C1. A tab 163 serves to hold on flap of the trousers over the other at the fly. As shown in Figure 16 the part C1 may be integral with the gusset part D2. And, these parts are connected to the trousers substantially as shown in Figures 1 to 13.

The construction shown in Figure 15 is much similar with the exception that the jock part C2 is not joined to the pant legs at all except by the buttons 180 and 181 and this part merely serves to cover the fly.

The shape of the jock part C2 is shown in Figure 17 and, as in the case of Figure 16, there is a part D2 which forms a continuation of the jock part C2.

Figure 19:
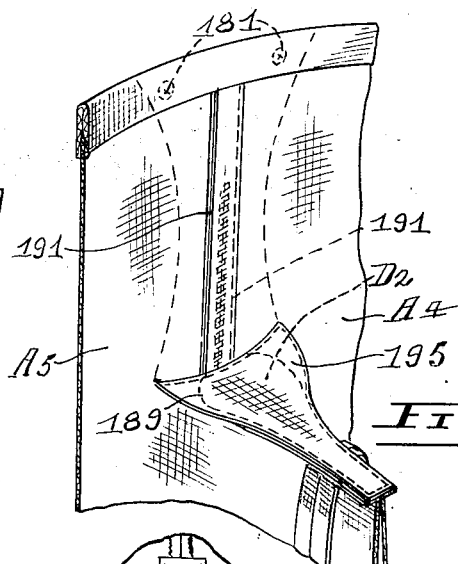
Figure 19 is a fragmentary rear elevation showing the inside of the garment of Figure 15.

The assembly of the garment is best shown in the fragmentary view of Figure 19. It will be seen that the leg part A4 and A5 are joined at the edges to the catch part D2 by stitching 189 and then to the zipper tape 190, 191. The gusset lining 195 is shown covering the catch part D2.

Figure 20:
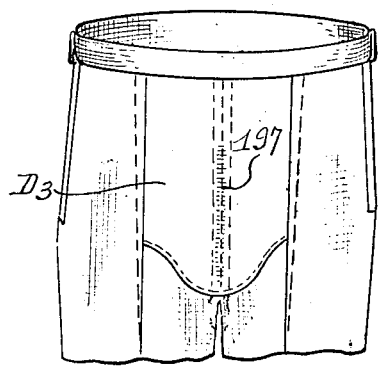
Figure 20 is a fragmentary front elevation of a pair of trousers constructed according to still another embodiment of the invention.
Figure 21:
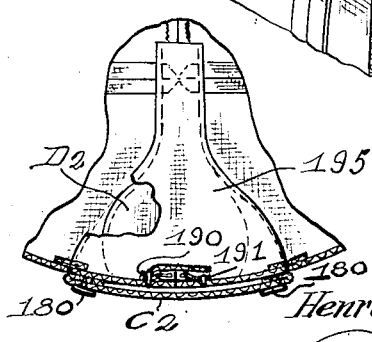
Figure 21 is a fragmentary horizontal cross section along the line 21—21 of Figure 15.

Figure 20 shows still another construction. In this construction, instead of there being a transverse slide fastener or slide fastener on the bottom of the jock part D3, the bottom margin of the jock part is joined directly to the pant leg. And, a vertical slide fastener 197 is provided.

I claim:

Trousers comprising a front made up of a pair of leg pieces, adjacent the crotch, the upper part of the central portion of the leg pieces and gusset terminating in a substantially U-shaped margin constituting one border of a fly opening, a jock part connected to the upper and side edges of the leg parts and having a lower marginal portion bordering said fly opening, and fastening elements on said respective marginal portions whereby the fly opening is normally held closed.

References Cited in the file of this patent

UNITED STATES PATENTS

| | | |
|---|---|---|
| 1,861,383 | Ficcio | May 31, 1932 |
| 2,138,481 | Chatfield | Nov. 29, 1938 |
| 2,493,822 | Meggs | Jan. 10, 1950 |

FOREIGN PATENTS

| | | |
|---|---|---|
| 119,288 | Germany | Apr. 9, 1901 |